United States Patent
Pola

(10) Patent No.: US 10,152,489 B2
(45) Date of Patent: Dec. 11, 2018

(54) SYNCHRONIZE COLLABORATION ENTITY FILES

(71) Applicant: salesforce.com, inc., San Francisco, CA (US)

(72) Inventor: Peda Venkateswarlu Pola, Union City, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 625 days.

(21) Appl. No.: 14/809,077

(22) Filed: Jul. 24, 2015

(65) Prior Publication Data

US 2017/0024410 A1 Jan. 26, 2017

(51) Int. Cl.
*G06F 17/30* (2006.01)
*H04L 29/08* (2006.01)

(52) U.S. Cl.
CPC ........ *G06F 17/30174* (2013.01); *H04L 67/06* (2013.01); *H04L 67/1095* (2013.01); *H04L 67/306* (2013.01)

(58) Field of Classification Search
CPC ........ G06F 17/30174; G06F 17/30575; G06F 17/30144; G06F 17/30082; G06F 17/30194; G06F 17/30067; G06F 11/2056; H04L 67/06; H04L 67/1095; H04L 67/306; G06Q 50/01
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |

(Continued)

OTHER PUBLICATIONS

"Google Plus Users", Google+Ripples; Oct. 31, 2011; 3 pages.

*Primary Examiner* — Noosha Arjomandi
(74) *Attorney, Agent, or Firm* — Schwabe Williamson & Wyatt

(57) ABSTRACT

A database system is arranged to support collaboration among users of a file in a feed system of a multi-user social network database driven system, wherein at least some of the users are permitted to upload a file to the feed from a remote computing device, and other users may have permission to collaborate on modifying the file. A sync client application executable on a remote user machine enables an authorize user to select "sync all files in the feed," which triggers (a) download of the latest version of all files in the feed from the cloud to all users associated with the feed, and (b) subsequent automatic synchronization of the files by selectively uploading to the cloud database a modified local copy of the file from a user machine, and then downloading a latest version of the modified file to all of the users associated with the feed.

19 Claims, 11 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,254,581 B2 * | 8/2007 | Johnson ............. G06Q 30/06 707/627 |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,294,522 B1 * | 3/2016 | Yeskel ............... H04L 65/4076 |
| 9,304,614 B2 * | 4/2016 | Kwong .................. G06F 3/038 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |

(56) References Cited

U.S. PATENT DOCUMENTS

| | | | |
|---|---|---|---|
| 2005/0091098 A1 | 4/2005 | Brodersen et al. | |
| 2005/0102156 A1* | 5/2005 | Linduff | G06Q 10/1057 705/322 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0144808 A1* | 6/2009 | Dhananjaya | G06Q 10/10 726/4 |
| 2009/0177744 A1 | 7/2009 | Marlow et al. | |
| 2011/0191417 A1* | 8/2011 | Rathod | G06Q 30/02 709/204 |
| 2011/0218958 A1 | 9/2011 | Warshavsky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2012/0331496 A1* | 12/2012 | Copertino | H04N 21/25866 725/14 |
| 2013/0212177 A1* | 8/2013 | Friedman | H04L 67/22 709/204 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0006352 A1* | 1/2014 | Sachs | G06F 8/71 707/638 |
| 2014/0229865 A1* | 8/2014 | Da Costa | G06F 3/04815 715/757 |
| 2014/0359537 A1 | 12/2014 | Jackobson et al. | |
| 2015/0052135 A1* | 2/2015 | Calkowski | G06F 17/3023 707/737 |
| 2015/0261917 A1* | 9/2015 | Smith | G06F 19/322 705/3 |
| 2015/0365347 A1* | 12/2015 | Sanders | H04L 51/32 709/204 |
| 2016/0048486 A1* | 2/2016 | Lopategui | G06F 17/2288 715/229 |
| 2016/0212211 A1* | 7/2016 | Micucci | H04L 67/02 |
| 2017/0185715 A9* | 6/2017 | Smith | G06F 19/322 |

* cited by examiner

SYNCHRONIZE COLLABORATION ENTITY FILES

COPYRIGHT NOTICE

Copyright 2015 Salesforce.com, Inc. A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to collaboration in authoring, posting and using electronic items in a network coupled to a database system or service.

BACKGROUND

"Cloud computing" services provide shared resources, software, and information to computers and other devices upon request or on demand. Cloud computing typically involves the over-the-Internet provision of dynamically-scalable and often virtualized resources. Technical details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3 shows an example of a group feed display on a group profile page according to some implementations.

FIG. 4 shows an example of a record feed display on a record profile page according to some implementations.

DETAILED DESCRIPTION

Figure 1A:
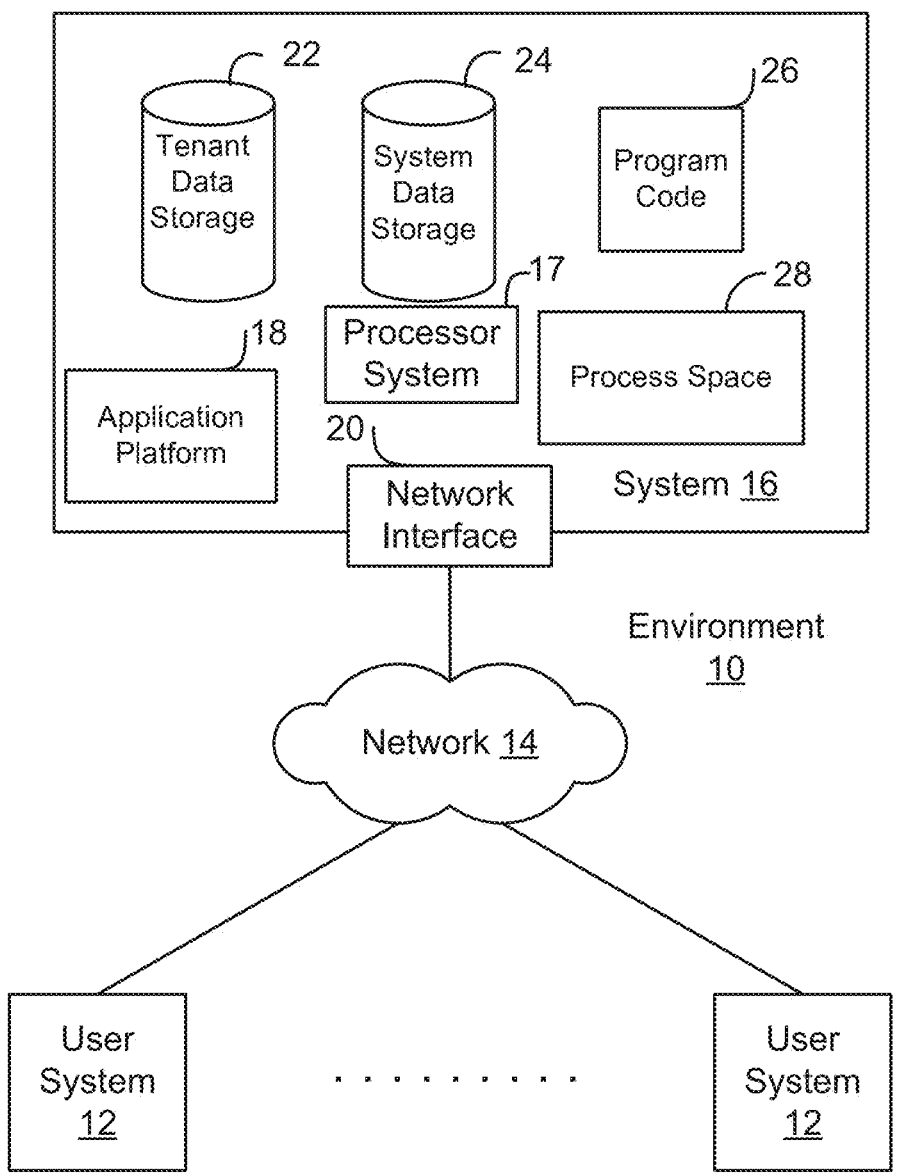
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media, or a combination thereof, arranged to support collaboration in the creation, editing and sharing electronic items in an enterprise social networking system.

In some embodiments, each of the members of a group of users who would collaborate on a file may install an instance of a synchronization client application program on their machine, or on each one of their multiple machines if they choose to do so. One example of such a group is the group associated to the feed display example of FIG. 5. With a single instruction or "click" by the group admin (or other duly authorized user), all of the files in the feed will be synchronized to all of the members of the group who run such a sync client. Any and all changes made by an authorized collaborator thereafter will be automatically distributed to the local file systems on each of those user machines that have the sync client. Further, any new file added to the same feed will be automatically distributed to all members of the feed who have the sync client app.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by Salesforce.com, Inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VB Script, and many other programming languages as are well known may be used. (Java™ is a trademark of Sun Microsystems, Inc.).

Figure 1B:
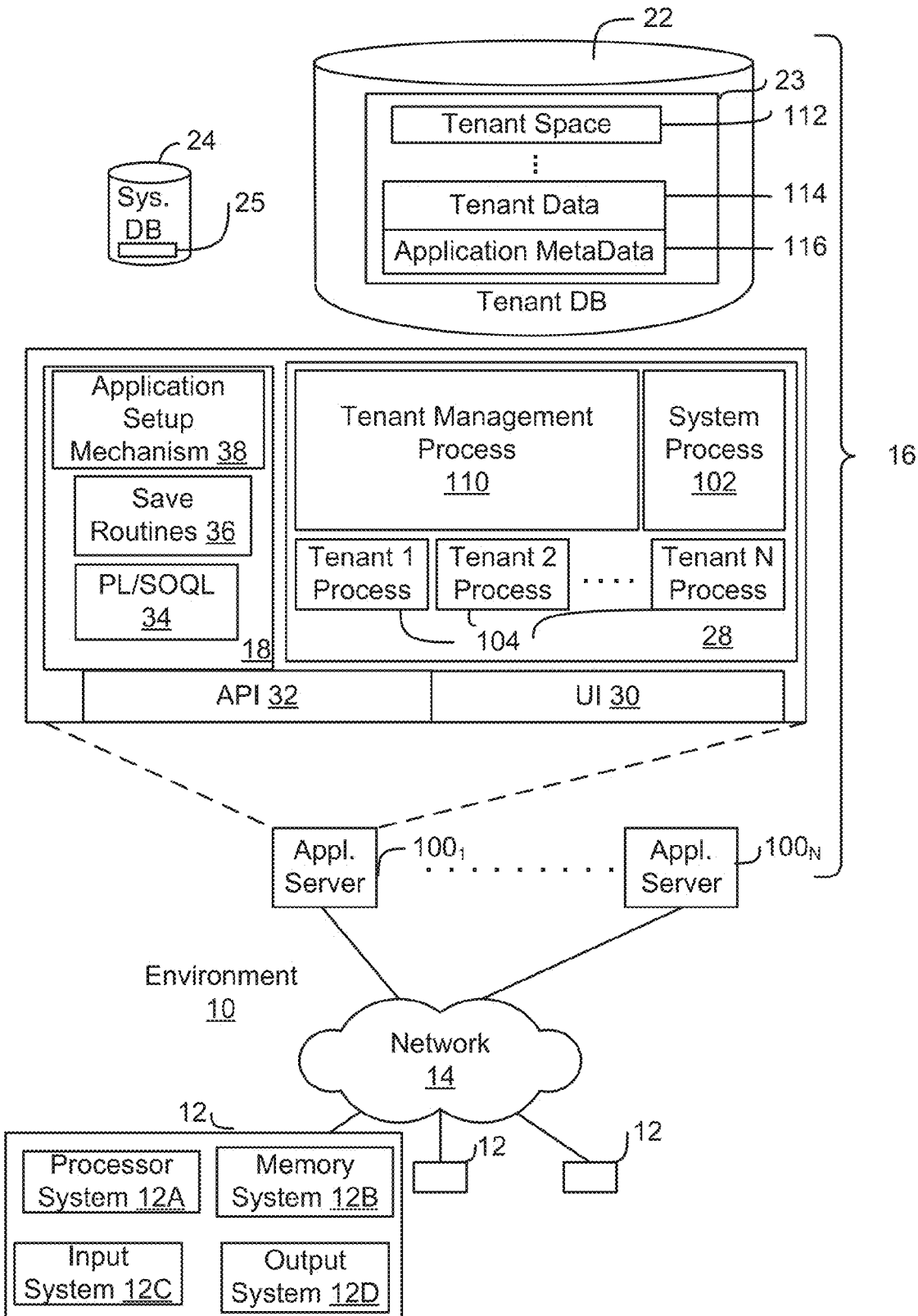
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems at virtually any location. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
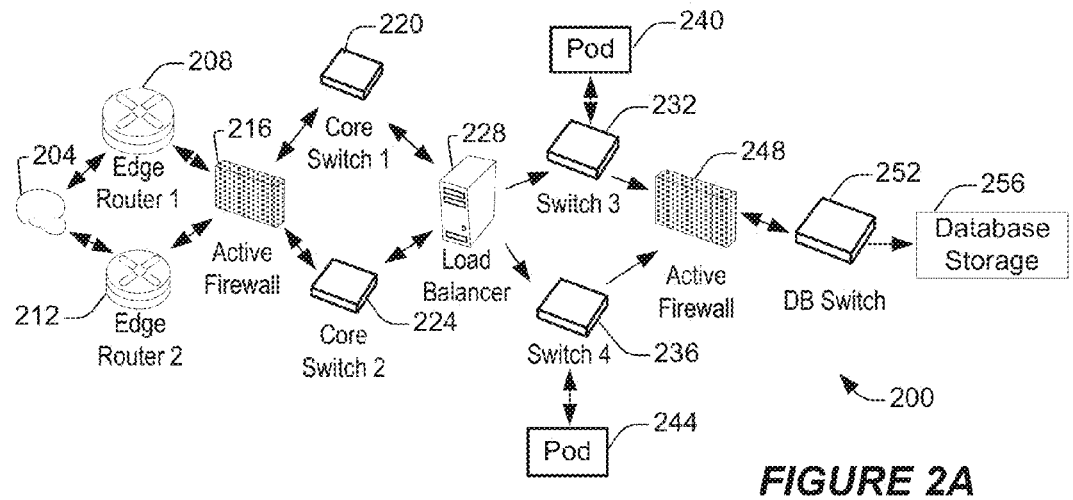
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
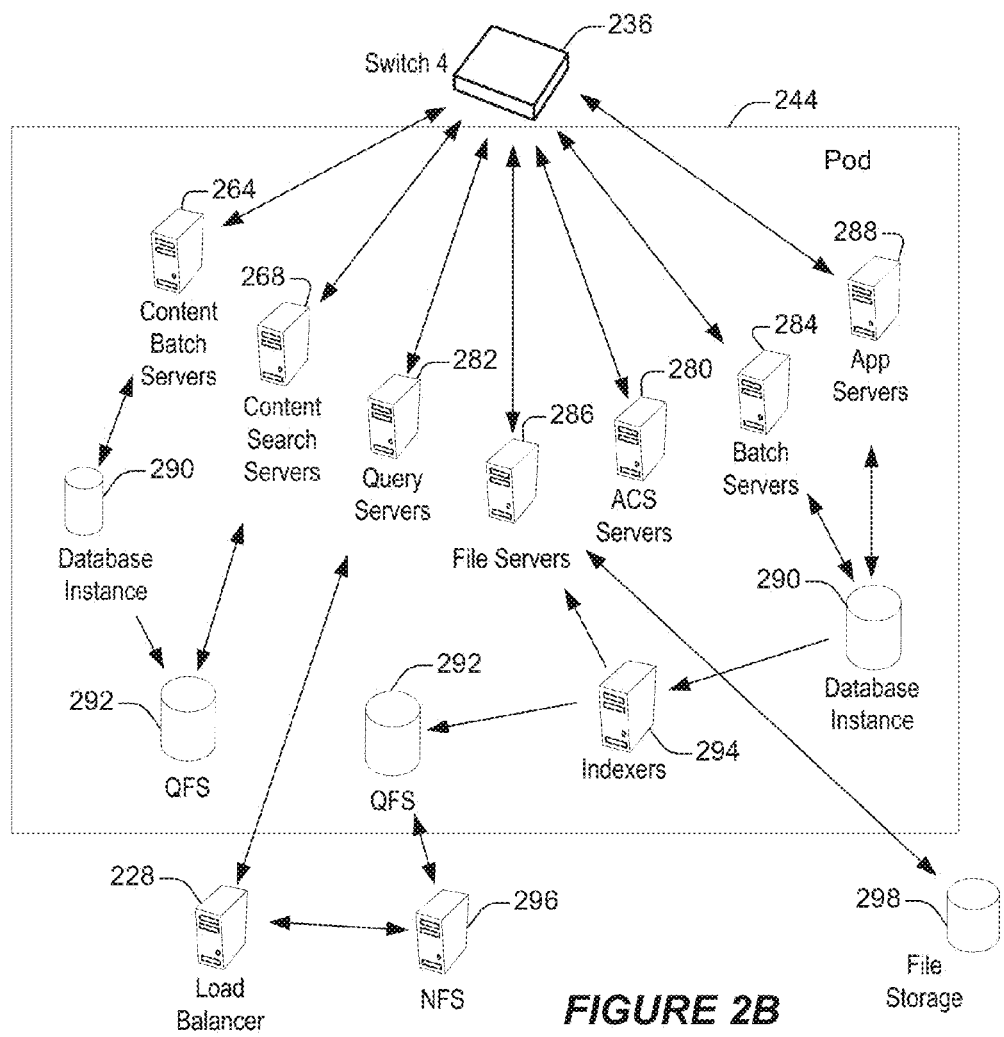
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Enterprise Social Networking

As initially described above, in some implementations, some of the methods, processes, devices and systems described herein can implement, or be used in the context of, enterprise social networking. Some online enterprise social networks can be implemented in various settings, including businesses, organizations and other enterprises (all of which are used interchangeably herein). For instance, an online enterprise social network can be implemented to connect users within a business corporation, partnership or organization, or a group of users within such an enterprise. For instance, a Chatter® can be used by users who are employees in a business organization to share data, communicate, and collaborate with each other for various enterprise-related purposes. Some of the disclosed methods, processes, devices, systems and computer-readable storage media described herein can be configured or designed for use in a multi-tenant database environment, such as described above with respect to system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking or expressing). As described below, the data can include messages created by other users. In implementations in which there are multiple tenants, a user is typically associated with a particular tenant (or "organization"). For example, a user could be a salesperson of an organization that is a tenant of the database system 16.

A "group" generally refers to a collection of users within an organization. In some implementations, a group can be defined as users with the same or a similar attribute, or by membership or subscription. Groups can have various visibilities to users within an enterprise social network. For example, some groups can be private while others can be public. In some implementations, to become a member within a private group, and to have the capability to publish and view feed items on the group's group feed, a user must request to be subscribed to the group (and be accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network.

A "record" generally refers to a data entity, such as an instance of a data object created by a user or group of users of the database system 16. Such records can include, for example, data objects representing and maintaining data for accounts, cases, opportunities, leads, files, documents, orders, pricebooks, products, solutions, reports and forecasts, among other possibilities. For example, a record can be for a business partner or potential business partner (for example, a client, vendor, distributor, etc.) of a user or a user's organization, and can include information describing an entire enterprise, subsidiaries of an enterprise, or contacts at the enterprise. As another example, a record can be a project that a user or group of users is/are working on, such as an opportunity (for example, a possible sale) with an existing partner, or a project that the user is trying to obtain. A record has data fields that are defined by the structure of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections" with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include publications presented as feed items or entries in the feed. A network feed can be displayed in a graphical user interface (GUI) on a display device such as the display of a user's computing device as described above. The publications can include various enterprise social network information or data from various sources and can be stored in the database system 16, for example, in tenant database 22. In some implementations, feed items of information for or about a user can be presented in a respective user feed, feed items of information for or about a group can be presented in a respective group feed, and feed items of information for or about a record can be presented in a respective record feed. A second user following a first user, a first group, or a first record can automatically receive the feed items associated with the first user, the first group or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or comment. For example, a post can include textual statements in combination with a document. The feed items can be organized in chronological order or another suitable or desirable order (which can be customizable by a user) when the associated feed is displayed in a graphical user interface (GUI), for instance, on the user's computing device.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item. In some implementations, a "like" or "dislike" also can be submitted in response to a particular post, comment or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As is also described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, posts, or comments. In some implementations, the group feed also includes publications and other feed items that are about the group as a whole, the group's purpose, the group's description, a status of the group, and group records and other objects stored in association with the group. Threads of publications including updates and messages, such as posts, comments, likes, etc., can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

In some implementations, data is stored in database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object" and a "Feed Items object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform.

In some implementations, the database system 16 includes a "Feed Items object." The Feed items object is a data structure that can be represented or conceptualized as a "Feed Items Table" that associates users, records and groups to posts, comments, documents or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform.

Enterprise social network news feeds are different from typical consumer-facing social network news feeds (for example, FACEBOOK®) in many ways, including in the way they prioritize information. In consumer-facing social networks, the focus is generally on helping the social network users find information that they are personally interested in. But in enterprise social networks, it can, in some instances, applications, or implementations, be desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network.

In some implementations, when data such as posts or comments from one or more enterprise users are submitted to a network feed for a particular user, group, record or other object within an online enterprise social network, an email notification or other type of network communication may be transmitted to all users following the respective user, group, record or object in addition to the inclusion of the data as a feed item in one or more user, group, record or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

Figure 3:
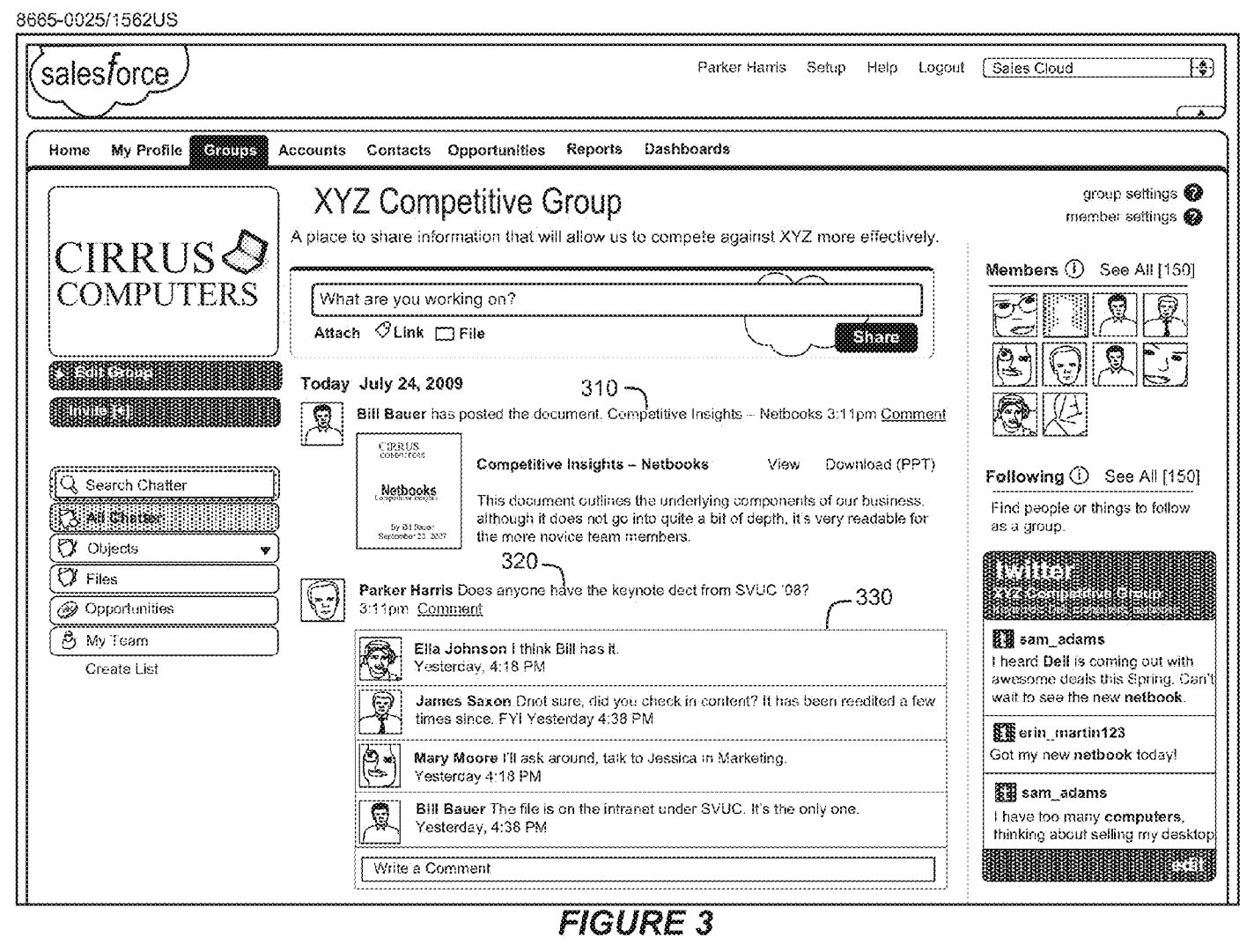

FIG. 3 shows an example of a group feed on a group profile page according to some implementations. As shown, a feed item 310 shows that a user has posted a document to the group feed. The text "Bill Bauer has posted the document Competitive Insights" can be generated by the database system in a similar manner as feed-tracked updates about a record being changed. A feed item 320 shows a post to the group, along with comments 330 from Ella Johnson, James Saxon, Mary Moore and Bill Bauer.

Figure 4:
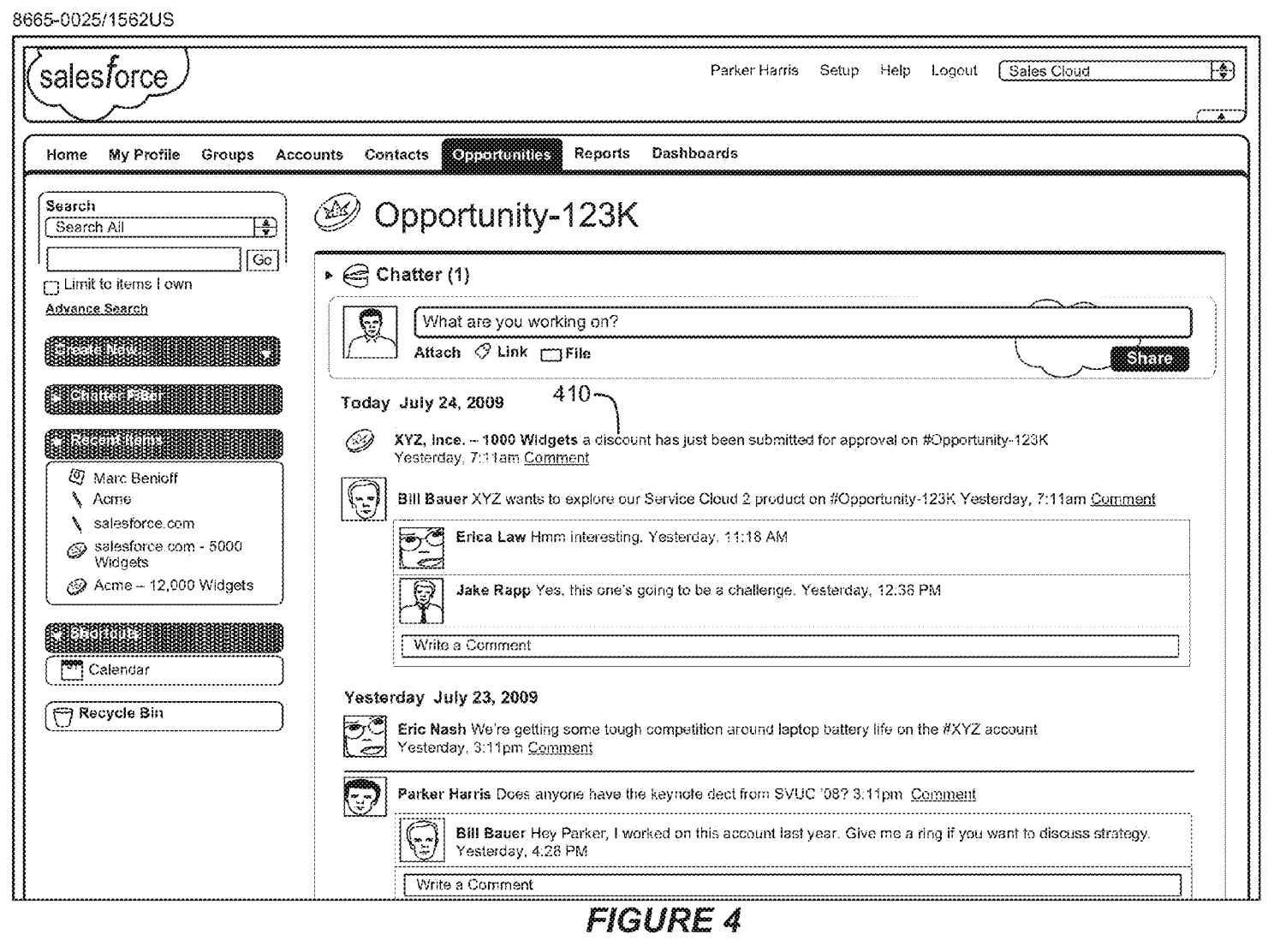

FIG. 4 shows an example of a record feed on a record profile page display according to some implementations. The record feed includes a feed-tracked update, a post, and comments. Feed item 410 shows a feed-tracked update based on the event of submitting a discount for approval. A feed-tracked update may be generated by the system automatically, as noted. Other feed items show posts, for example, from Bill Bauer, made to the record and comments, for example, from Erica Law and Jake Rapp, made on the posts. Adjacent to each post, there are buttons or controls to download the corresponding ppt file, and also a button marked "Sync" further described shortly.

III. Collaboration Among Multiple Users

Figure 5:
FIG. 5 shows an example of a feed screen display for a private group of users with a popup control interface.

One feature of the present disclosure is to enable collaboration among multiple users on the creation and revisions to any type of digital electronic file. In one embodiment, the users may be members of a group. FIG. 5 shows an example of a group feed screen display. Here, the Admin "Pola" of a private group called "Sync Client" posted a request for members to post presentations for a demonstration. Members John Goldie, Robert Lee, James Johnson and Richard Lee have posted replies or comments on the feed, as shown in the illustration. Each of them has posted a file as requested, specifically .ppt files in this illustration, although any other file types may be used.

Adjacent to each post are buttons or controls to download the corresponding attached file ("Download ppt") or to "Sync" the file. In the latter case, the button requests synchronization of the file. This request (1) causes download of the selected file from the cloud database to the requesting user's local file system; and (2) subscribes the user's machine(s) to automatically receive updates to the downloaded file. Accordingly, any time the file is changed, by the original author or by another authorized user, the local file system copy will be updated or replaced to match the latest version. In the former case ("Download ppt"), a simple download of the file to the local file system leaves it "orphaned" such that any subsequent updates or changes must be made by the user manually, and they are not communicated to other members of the group unless the local user sends out the changes "manually" by posting a message or the like.

A pop-up, pull-down post menu, or similar user interface component 500 may be provided on the feed display. It may provide for various operations such as bookmarking or adding a new topic. One option that may appear, in the case that a suitable synchronization client application is running on the user's local machine—further described below—is a "Sync all files" button. Clicking or otherwise selecting this option will trigger synchronization of all the files posted in the feed from the current time forward. Preferably, this action will cause automatic download of the latest versions of all the posted files currently in the feed, to a selected folder in the each user's local file system, and it will subscribe each user to automatically receive all updates to that set of files as further explained below. The updates or changes automatically received will include those generated by the posting author, as well as those generated by any or all other authorized group members who are subscribed for synchronization of the corresponding file. Further, all new files subsequently posted to the feed will also be synced, i.e., automatically downloaded to all members of the group who subscribed to synchronization (for example, with the "Sync all files" button). In this way, team members can collaborate on creating and or editing one or more files, and each of their local copies of the file(s) will remain automatically synchronized with the latest version of the file. Put another way, the user is subscribed to sync with the entire feed, and not just to selected files.

In some embodiments, clicking the "Synchronize all files" operation may open a directory in which a target folder may be created or selected. The synced files will be copied there. Various permissions may be used to control changes to a file, while enabling collaboration. For example, if one user is a "Viewer" for the file, the file may be downloaded to their machine(s) with read-only (RO) permissions. If a user has Collaborator rights on the file, the file may be downloaded with Read Write permissions to that user. Thereafter, if the owner or any authorized "Collaborator" makes any new revision to the file, it will be updated in the cloud, and it will be automatically downloaded to all users who are subscribed for synchronization of that file. More specifically, revisions are not typically made "in the cloud" directly. In some embodiments, revisions may be made in a user's local machine, and a synchronize application program executed on the local machine may upload the changes or revised file to the cloud as further explained below. If a user has multiple machines, a synchronize application program may automatically sync the files all over of the user's machines.

Figure 6:
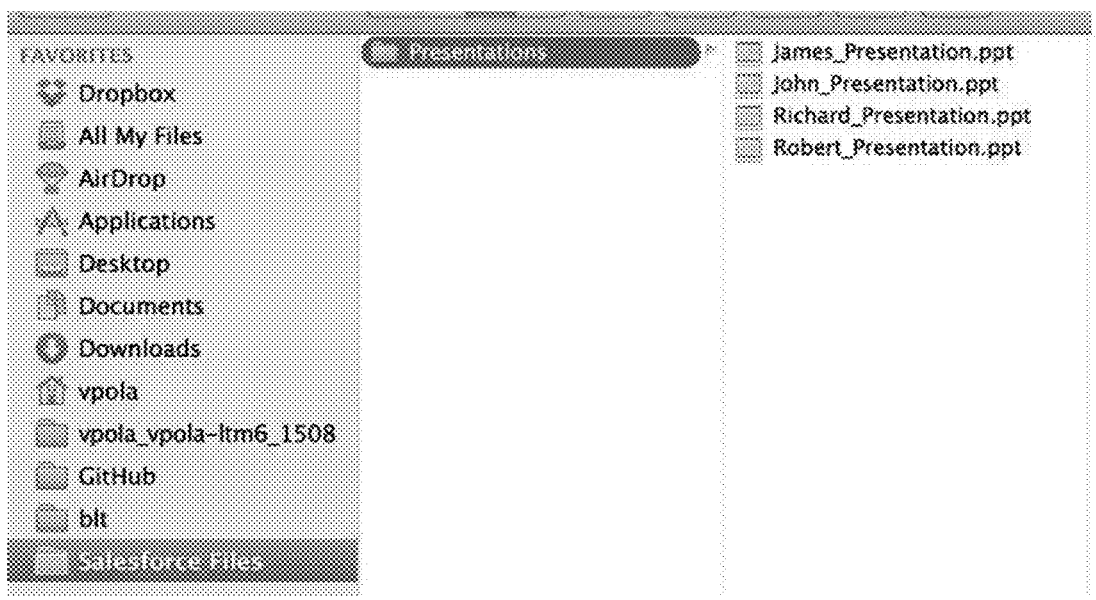
FIG. 6 shows an example of a local file system directory in which selected files may be automatically collected and maintained in synchrony.

FIG. 6 shows an example of a local file system directory in which selected files may be automatically collected and maintained in synchrony. In this illustration, a folder called "Salesforce Files" is used by a local synchronization client application for local file storage. A subfolder named Presentations (or any other valid name) is created by the local machine user, and designated as a target directory for storing files to be synchronized. For example, a user may designate a different folder for each group or feed in which they are subscribed for synchronize of at least one file. The folder names are merely for illustration and are not critical. In the figure, the four .ppt presentation files that were posted in the feed in FIG. 5 are shown as stored in the local directory. In an embodiment, download of the four files was accomplished by a single click of the "Sync all files" button described above with regard to FIG. 5. These local copies will be automatically updated to reflect the latest version of each file (synchronized) as long as they are subscribed for synchronization.

Figure 7:
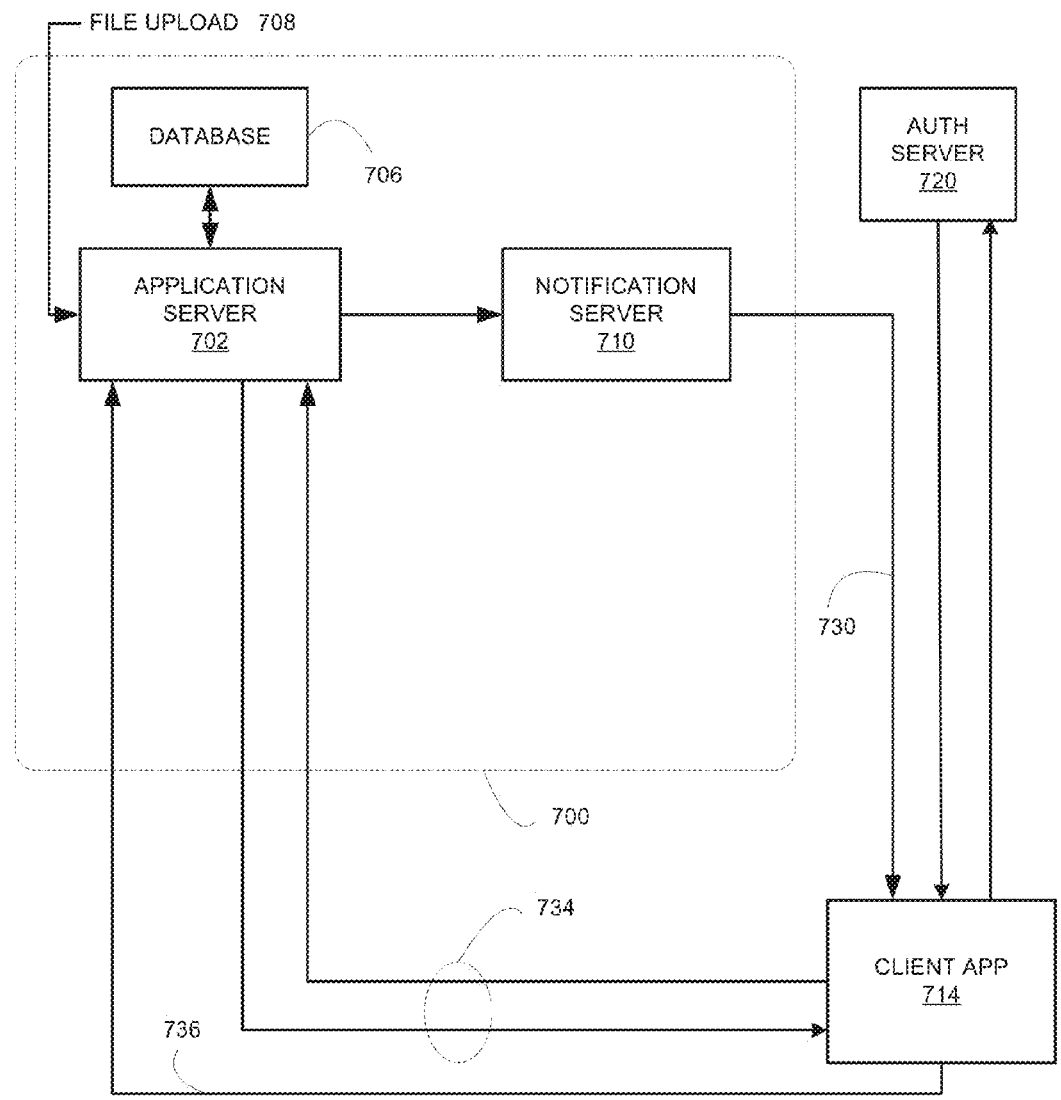
FIG. 7 is a simplified block diagram illustrating an example of a system architecture that employs a client application program in support of synchronization of database files for collaboration.

FIG. 7 is a simplified block diagram illustrating an example of a system architecture that employs a client application program in support of synchronization of database files for collaboration. In FIG. 7, a cloud system indicated by dashed line 700 may be similar to the cloud system described above with regard to FIGS. 1-3. The cloud system 700 may include one or more application servers 702 which may be configured to provide various services, and run applications, for users, client entities or tenants. In an embodiment, application servers 702 may be coupled to one or more database systems 706. The app server 702 may upload a file from a user machine (not shown) through a web application or other system or protocol, indicated at file upload 708. For example, a file may be uploaded to a feed. The uploaded file may be stored in the database 706 by the application server.

Events that affect a file, such as file uploads, file changes, etc. may be communicated by the app server to a notification server 710. A primary function of the notification server is to send or publish notifications of such events to appropriate client devices, illustrated at path 730. In an embodiment, the client devices may be identified as devices associated with a user who has subscribed to receive updates, i.e., remain synchronized, with regard to one or more particular files stored in the system. Where a file is associated to a group or other entity, the notification server may send notification of changes to the file to the associated group.

In a preferred embodiment, notifications may be sent from the notification server 710 to one or more synchronization client applications ("client app" or "sync app") 714. The client application 714 may be executed on a user machine, such as a user system 12 shown in previous drawings. The user systems 12 can be implemented as any computing device(s) or other data processing apparatus or systems usable by users to access the cloud system. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. A user may be associated with more than one device or machine. The Notification Server may be configured to send notifications of file events to all of a user's associated devices that are running a client app such as 714. In some embodiments, the client application may maintain a persistent connection with the cloud system. It may check periodically for notifications from the notification server 710. In other embodiments, various push or pull notifications may be used.

The client app 714 may be authenticated by an authentication server 720. The client app is configured to receive notifications of file additions or changes via path 730 using any appropriate format or protocol now known or later developed. The application server 702 may manage transfer of files between the cloud system and the client app 714, as indicated by pathway or channel 736. Such file transfers may be implemented with one or more intermediary entities or services (not shown). In some embodiments, the client app may request a file from the application server.

Figure 8:
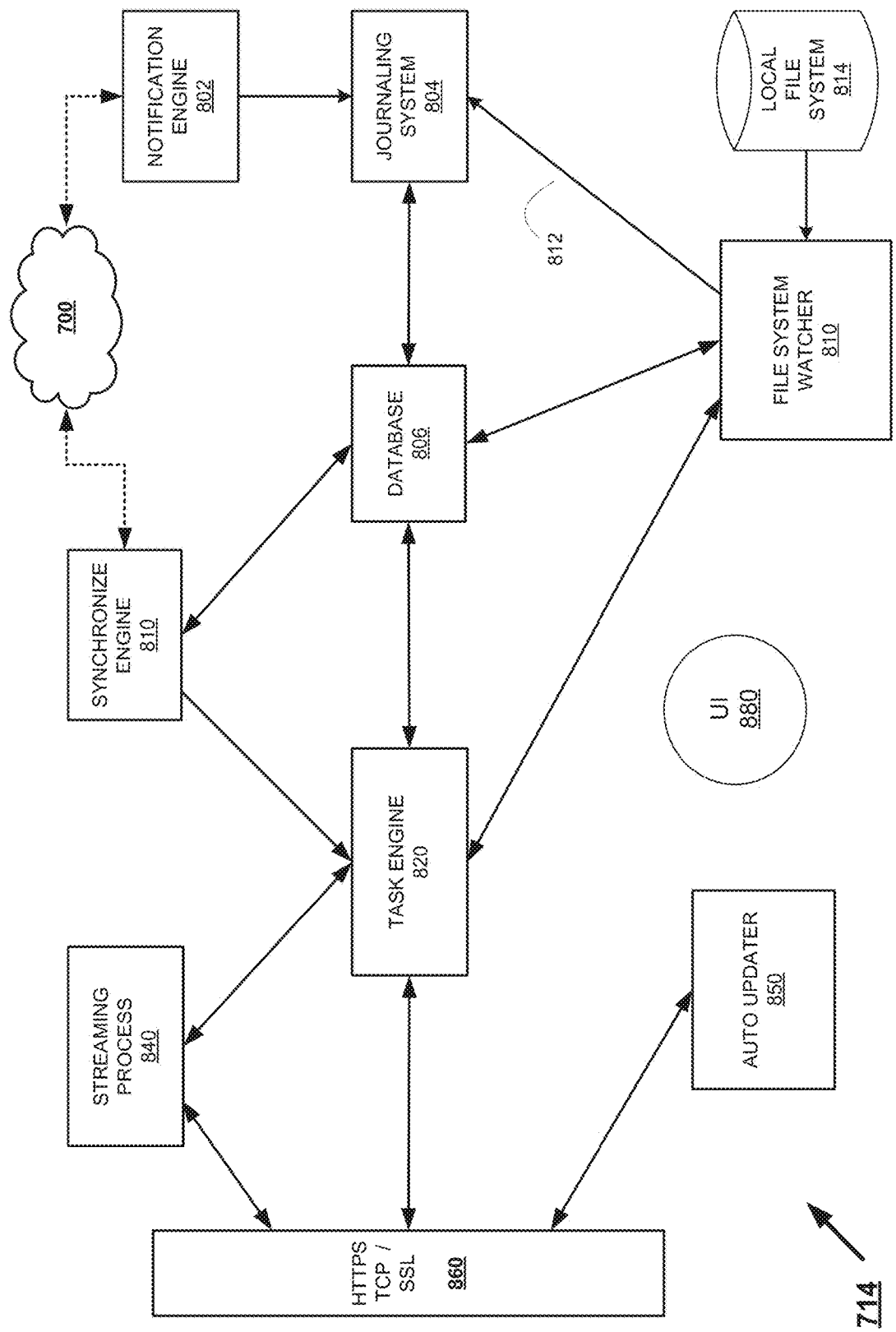
FIG. 8 is a simplified block diagram showing the principle components of one example of a synchronization client application program.

FIG. 8 is a simplified block diagram showing the principle components of one example of a synchronization client application program. The client app (for example, 714 in FIG. 7), is communicatively coupled to the cloud 700. Preferably, this connection may be a persistent or "always on" connection. This connection may be established with an application server (702 in FIG. 7). A notification engine 802 is configured to receive notifications of events from the cloud 700 when a file is added or changed. That is, the events affect the "cloud copy" or version of a file. The notification engine 802 passes information about the cloud copy file change to a journaling system 804. Such events may include, for example, a file download, update, rename, etc. In the cloud database system. In an embodiment, the journaling systems keeps track of all changes to the files. It may maintain a journal for that purpose, which may be stored in a database 806 operatively coupled to the journaling system 804. (Database 806 in the client app is distinct from the database 706 in the cloud.)

In addition, local components should be provided to monitor and track local changes to a file that has been marked or selected for synchronization. To that end, a file is stored in a local file system. For example, a Windows or Mac file system 814 may be provisioned on a user machine. A file system watcher component 810 is configured to monitor the file system 814. In an embodiment, the FS watcher copies the file to the database 806, and then updates the file (in the database) responsive to changes observed in the local file system 814. In addition, the FS watcher component notifies the Journaling System 804 of local changes to the file, indicated via path 812. Thus, in a preferred embodiment, the journaling system keeps track of both cloud and local changes to the files, and records the changes in the journal in database 806.

A synchronization engine component 810 may be operatively coupled to the database 806. In an embodiment, the synchronization engine monitors events stored in the journal, and it also obtains the latest file information from the cloud. The synchronize engine 810 may communicate with the cloud as needed (on demand), for example, when a journal entry indicates a change to a file. The sync engine 810 may communicate with the application server. In an embodiment, the synchronize engine "knows" the affected file ID, filename, etc. Logic implemented in the synchronize engine compares the latest cloud metadata to the corresponding file local metadata. Based on these inputs, the synchronize engine determines an appropriate task to keep the file synchronized to the latest version. Such a task may comprise, for example, a file upload, in the case that the local version of the file is more current (i.e., more recently changed), or a download from the cloud in the case that the cloud version is more current. The synchronize engine 810 may forward the determined task to a task engine 820 to carry out the task. For example, a download from the cloud. In an embodiment, a streaming process 840 may be implemented for downloading a file from the cloud; it may inform the task engine when the download is completed.

A communication component or layer 860 may be provided in, or coupled to the client application. For example, the communication component 860 may implement HTTPS, TCP, SSL or any other suitable data communication protocol, now known or later developed. The communication component may be configured to communicate with an app server in the cloud, for example, server 702 in FIG. 7, to upload or download a file as directed by the task engine. Responsive to completing a download operation, the task engine may request the FS Watcher to copy the file to a designated folder in the local file system. An example is shown for illustration as the "Salesforce Files" folder in FIG. 6. In the example, a subfolder named "Presentations" is designated to store a set of files corresponding to the user group that is using them, for example, the group shown in the feed page in FIG. 5.

Figure 9:
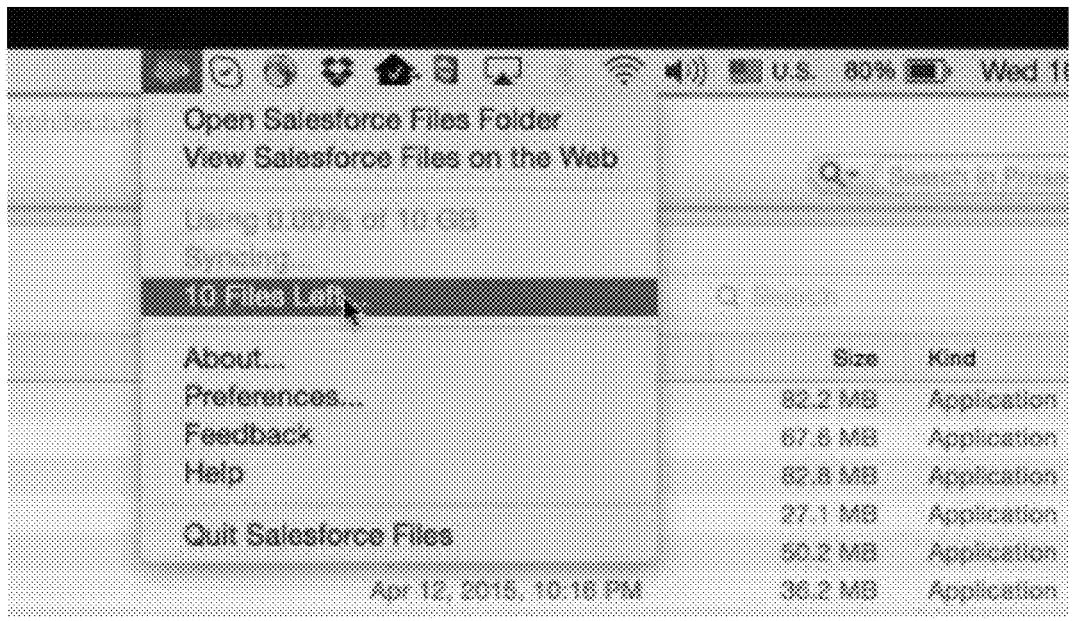
FIG. 9 is an illustration of an example of a user interface component for a synchronization client application program.
Figure 10:
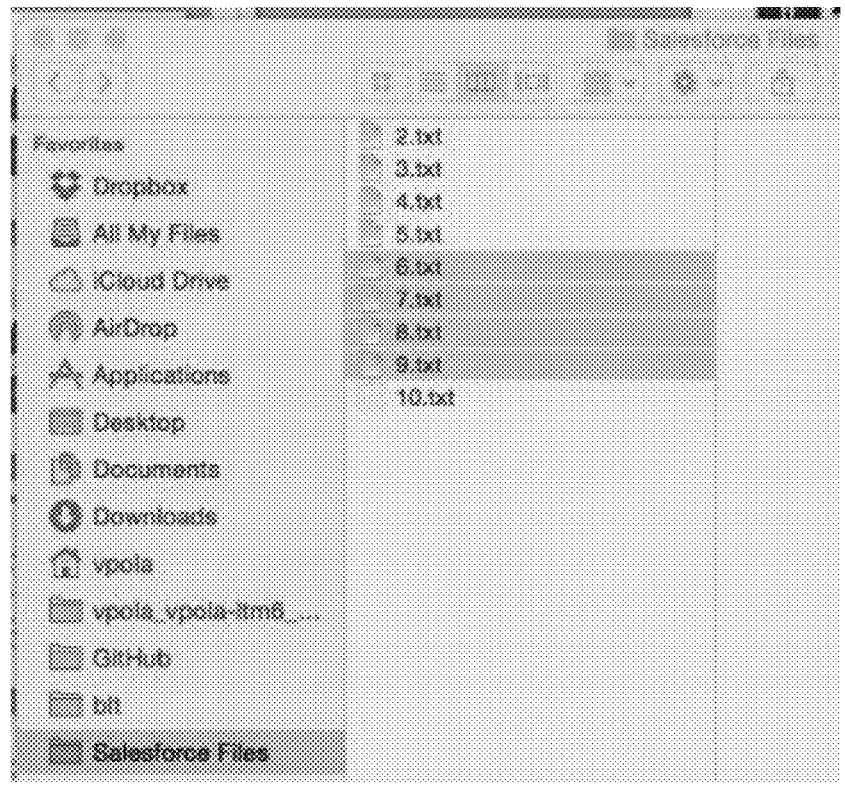
FIG. 10 illustrates a display of a file system folder of files associated with synchronization client application program for synchronization.
Figure 11:
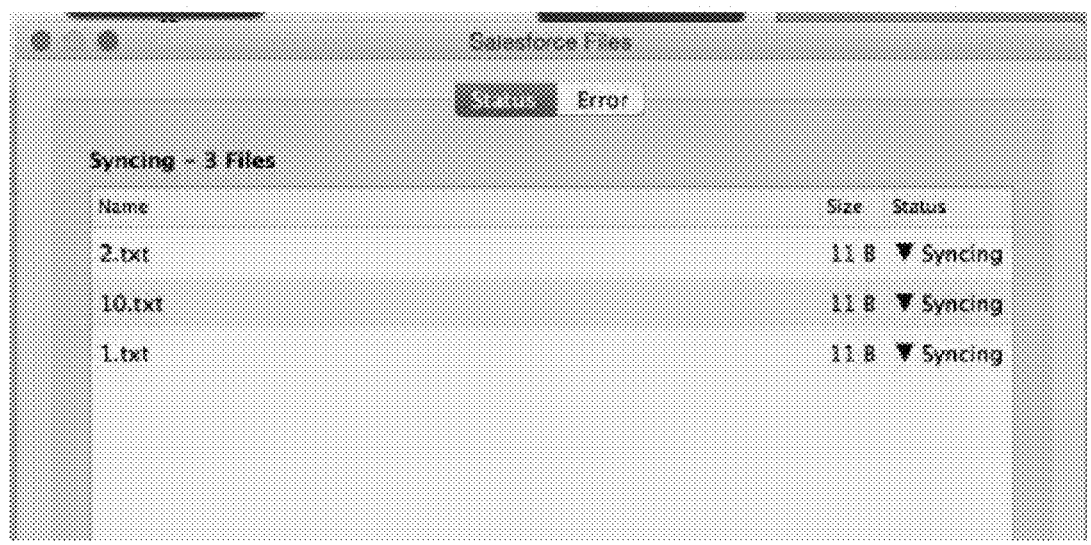
FIG. 11 illustrates an example of a sync status panel that may be displayed in a user interface of a synchronization client application program.

The client app 714 may include a user interface (UI) component 880. The UI in one example may display a synchronize icon on the user's screen display, for example, at the top or title bar as shown in FIG. 9. The image in FIG. 9 shows the interface in use (for example, it may drop down responsive to a pointer hovering), and it presents options such as open the app file folder (in the image called Salesforce Files folder), etc. FIG. 10 illustrates a display of a file system folder of files associated with synchronization client application program. This folder may be opened in response to the drop down control. In an embodiment, the client app begins synchronization automatically as soon as it is launched. Synchronization activity may be indicated by some animation in the app icon (here a cloud). The UI interface may indicate whether the client app is currently syncing. It FIG. 9 it indicates that is it currently syncing, and further indicates its progress, "10 Files Left" in the illustration. If the user clicks "open [folder name]" (the name is Salesforce Files in the example), the file system shows a list of the files being synchronized—as illustrated in FIG. 10, listing files 2.txt to 10.txt. In an embodiment, the interface may further display specific status for each file being syncing, as illustrated in the display panel shown in FIG. 11. Here, three files are still syncing and their names (2.txt, 10.txt etc.) are shown, along with current status ("Syncing"). In this way, the user interface provides convenient access to observe what files are synced synced and their status.

Each of the members of a group of users who would collaborate on a file may install an instance of the synchronization client application program on their machine, or on each one of their multiple machines if they choose to do so. One example of such a group is the group associated to the feed display example of FIG. 5. With a single instruction or "click" by the group admin (or other duly authorized user), all of the files in the feed will be synchronized to all of the members of the group who run such a sync client. Any and all changes made by an authorized collaborator thereafter will be automatically distributed to the local file systems on each of those user machines that have the sync client. Further, any new file added to the same feed will be automatically distributed to all members of the feed who have the sync client app. If a user machine is off-line or disconnected from the cloud for a time, or the sync client app is not running for a time, the app will "catch up" and sync the affected files to the latest version automatically when it is again running and has connectivity. If the app is running and cannot communicate with the cloud, it can queue up necessary actions, for example, using the task engine and communication interface components described above.

A user of the sync client application need not necessarily receive every update to every synced file if they choose not to do so. For example, an unsync option or a pause sync per file option may be implemented. At the cloud level, a group admin, for example, may choose to pause or stop syncing one or more of the files in the group feed. In an embodiment, the notification server may then stop sending notifications of events related to the selected file(s). At the client application level, a user also may have an option to pause or stop syncing on a per file basis. These options may be added to the user interface described above. In an embodiment, the journaling system may then ignore, or treat differently, the selected file(s). In one example, an Unsync option may be implemented so that it deletes the corresponding file locally but physical the file still remains in the cloud. In another example, a Pause sync function may retain the local file unchanged, except for local changes, but then sync it to the latest version in the cloud when instructed to resume syncing.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A method for a database system that includes at least one application server to support collaboration among users of a file in a feed system of a multi-user social network provided by the database system, the feed system managing and electronically publishing at least one feed comprising a series of feed items, the feed accessible to a set of users associated with the feed for communicating among the set of users, wherein at least some of the users are permitted to upload a file to the feed from a remote computing device, the method comprising the steps of:

establishing at the application server a connection with a remote computing device;

receiving at the application server a request from the remote computing device to synchronize all files in a selected feed;

responsive to the request, identifying, by the application server, a set of at least one file associated to the selected feed;

identifying, by the application server, a latest version of each file in the set;

initiating, by the application server, a download of the latest version of each file in the set to the remote computing device;

monitoring the remote computing device to detect a modification of one of the files in the selected feed;

responsive to detecting a modification of the file, uploading the modified file to the application server as the latest version of the modified file; and initiating, by the application server, a download of the latest version of the modified file to each user who previously subscribed to synchronization of the file.

2. The method of claim 1 further comprising identifying all users who are synchronization subscribers to at least one of the set of files; and initiating, by the application server, a download of the latest version of each file to which a user is a synchronization subscriber, to a machine associated with the corresponding user.

3. The method of claim 2 wherein the initiating a download step includes identifying at least one machine associated to each synchronization subscriber and downloading the latest version of the file to all of the identified machines.

4. The method of claim 1 wherein the selected feed is associated with one of a group of CRM objects, the group comprising an account, a contact, and an opportunity.

5. The method of claim 1 further comprising associating a selected local file folder in the remote computing device to the selected feed, and initiating a download of the latest version of each file in the set to the associated local file folder.

6. The method of claim 1, further comprising:

identifying all users who are synchronization subscribers to at least one of the set of files; and initiating a download of the latest version of each file to which a user is a synchronization subscriber, to the corresponding user.

7. The non-transitory computer-readable medium of claim 6, wherein the triggering event is detected via at least one of a microphone and an image sensor, and the audible response is outputted via one or more directional loudspeakers.

8. The method of claim 1 wherein the selected feed is associated with one of a group of CRM objects, the group comprising an account, a contact, and an opportunity.

9. The non-transitory computer-readable medium of claim 1, wherein the direction in which the source is located is determined via at least one of a microphone and an image sensor, and the response is outputted via one or more directional loudspeakers.

10. A cloud computing system comprising:

a database system arranged to support collaboration among users of a file in a feed system of a multi-user social network provided by the database system, the feed system managing and electronically publishing at least one feed comprising a series of feed items, the feed accessible to a set of users associated with the feed for communicating among the set of users, wherein at least some of the users are permitted to upload a file to the feed from a remote computing device;

the database system including at least one application server arranged to provide services, and run applications, for users or client entities of the database system, wherein the application server is configured to:

establish a connection with the remote computing device;

receive a request from the remote computing device to synchronize all files in the feed, identify the latest version of at least one particular file in the feed, and communicate, to automatically initiate synchronization of at least the one particular file, selected events to the notification server introduced below, the events selected as those affecting the particular file in the feed; and the database system including a notification server configured to receive the selected events from the application server and to publish notifications of the selected events to remote client devices;

wherein the published notifications are arranged to be used by the remote client devices to trigger synchronization of a corresponding local copy of the particular file on each client device to a cloud copy of the particular file maintained in the database system.

11. The system of claim 10 wherein the notification server is implemented as a software component.

12. The system of claim 10 wherein the selected events include uploading a new file to the feed and modifying an existing file in the feed, so as to enable the remote client devices to maintain synchronization by downloading the new file or modifying a local copy of the modified file, as applicable, responsive to receiving a notification of the selected event.

13. The system of claim 10 wherein the selected events include deleting or renaming a file in the feed, so as to enable the remote client devices to maintain synchronization by deleting or renaming a local copy of the affected file, as applicable, responsive to receiving a notification of the selected event.

14. The system of claim 10 wherein the feed is associated with one of a group of CRM objects, the group comprising an account, a contact, and an opportunity.

15. The system of claim 10 wherein:

the database system is configured to maintain a record of users who are subscribed for synchronization of a particular file; and the notification server is configured to publish notifications of the selected events to the users who are subscribed for synchronization of the particular file.

16. A method comprising:

at a user machine, establishing a connection by a synchronization client application program with an application server in a cloud computing system that implements a feed system of a multi-user social network, the feed system managing and electronically publishing at least one feed comprising a series of feed items, the feed accessible to a set of users associated with the feed for communicating among the set of users, wherein at least some of the users are permitted to upload a file to the feed from a remote computing device; and, at the user machine, by the synchronization client application program:

requesting, via the connection, to synchronize all files associated with the feed;

via the connection, receiving a notification from the application server of an event from the cloud computing system, wherein the event affects a selected file associated to the feed that is identified by the application server;

maintaining a journal of the notifications received from the cloud computing system of events that affect a cloud copy of the selected file;

monitoring a local file system to detect changes that affect a local copy of the selected file;

adding to the journal indicia of the detected changes to the local copy;

based at least in part on the journal entries, determining a task to synchronize the local copy and the cloud copy of the selected file; and executing the task to sync to synchronize the local copy and the cloud copy of the selected file to a most recently changed version of the file, wherein executing the task includes communicating with the cloud computing system.

17. The method of claim 16 wherein determining the task includes obtaining metadata about the cloud copy of the selected file from the cloud computing system, and comparing the obtained metadata to metadata generated by said monitoring of the local file system to detect changes that affect the local copy of the selected file, to determine which is the most recently changed version of the file.

18. The method of claim 16 wherein executing the task includes one of uploading the local copy of the selected file to the cloud computing system and downloading the cloud copy of the selected file to the local file system.

19. The method of claim 16 wherein executing the task to sync to synchronize the local copy includes communicating with an application server of the cloud computing system.

\* \* \* \* \*